(12) United States Patent
Tsui

(10) Patent No.: US 11,444,472 B2
(45) Date of Patent: Sep. 13, 2022

(54) PORTABLE POWER BANK WITH CARD STORAGE FUNCTION

(71) Applicant: Yin Ping Pierre Yu, N.T. (HK)

(72) Inventor: Ka Yin Tsui, N.T. (HK)

(*) Notice: Subject to any disclaimer, the term of this patent is extended or adjusted under 35 U.S.C. 154(b) by 349 days.

(21) Appl. No.: 16/879,764

(22) Filed: May 21, 2020

(65) Prior Publication Data

US 2021/0143654 A1 May 13, 2021

(30) Foreign Application Priority Data

Nov. 7, 2019 (CN) .......................... 201921081789.2

(51) Int. Cl.
*H02J 7/00* (2006.01)
*G06F 13/42* (2006.01)

(52) U.S. Cl.
CPC ........ *H02J 7/0045* (2013.01); *G06F 13/4282* (2013.01); *G06F 2213/0042* (2013.01)

(58) Field of Classification Search
CPC ................ H02J 7/0045; G06F 13/4282; G06F 2213/0042; A45C 11/182; A45C 11/18; A45C 15/00
See application file for complete search history.

(56) References Cited

U.S. PATENT DOCUMENTS

| 7,721,954 B1 * | 5/2010 | Karamian | A45C 15/00 |
| | | | 235/380 |
| D911,939 S * | 3/2021 | Roberts | D13/103 |
| 2018/0354698 A1 * | 12/2018 | Levneff | A45C 1/08 |
| 2020/0167306 A1 * | 5/2020 | Wu | G06F 13/4022 |
| 2020/0412145 A1 * | 12/2020 | Rosenthaler | A61L 9/22 |
| 2021/0143654 A1 * | 5/2021 | Tsui | A45C 15/00 |
| 2022/0123777 A1 * | 4/2022 | Melikyan | H04B 1/3888 |

FOREIGN PATENT DOCUMENTS

| CN | 209930013 U | * | 1/2020 | | A45C 11/18 |
| WO | WO-2019175863 A1 | * | 9/2019 | | A61L 9/22 |
| WO | WO-2020051553 A1 | * | 3/2020 | | |
| WO | WO-2022081747 A1 | * | 4/2022 | | A45C 1/06 |

* cited by examiner

*Primary Examiner* — Stacy Whitmore

(57) ABSTRACT

A portable power bank with card storage function include a portable power bank module and a card case module; the portable power bank module and the card case module are slidably connected via a connector; the portable power bank module is provided with a guiding mounting rod; the guiding mounting rod is mounted in a sliding slot of the connector; the sliding slot is recessed inwards with an opening at each end thereof; the portable power bank module is assembled to the sliding slot via the guiding mounting rod; one side of the card case module is provided with a connecting strap which is hollow inside and opens at both ends; the connecting strap is connected to the connector via a connecting shaft. This invention has the advantages of providing users with the convenience of card storage and serving as a contingency power supply for supplying power to electronic devices. It serves multiple functions and is convenient for actual use. It is easy to carry, helps to prevent loss of properties, and suitable for users' needs. The card case module and the portable power bank module can be dissembled and used separately.

5 Claims, 1 Drawing Sheet

PORTABLE POWER BANK WITH CARD STORAGE FUNCTION

BACKGROUND OF THE INVENTION

This invention relates to the daily articles and more specifically pertains to a portable power bank with card storage function.

Card case is a common card storage device and is an everyday item carried by many businessmen. Meanwhile, mobile phone, as the most commonly used communication equipment in this century, is a communication device carried by many businessmen every day. However, a mobile phone itself has limited battery capacity, so a portable power bank has become a daily necessity for businessmen. As there are more daily necessities to carry, it is easier to loss some of the items, thus causing inconvenience to users.

BRIEF SUMMARY OF THE INVENTION

In view of the above, this invention provides a portable power bank with card storage function which provide users with the convenience of card storage and serves as a contingency power supply for supplying power to electronic devices. It serves multiple functions and is convenient for actual use. It is easy to carry, helps to prevent loss of properties, and suitable for users' needs. The card case module and the portable power bank module are slidably connected via the connector. The card case module and the portable power bank module can be dissembled and used separately. The card case module can be rotated left and right around the connecting shaft. The user can select one side of the card case module as the outer side according to his/her own preference.

To attain this, this utility model adopts the following technical solutions:

A portable power bank with card storage function, wherein it comprises a portable power bank module and a card case module; the portable power bank module and the card case module are slidably connected via a connector; the portable power bank module is provided with a guiding mounting rod; the guiding mounting rod is mounted in a sliding slot of the connector; the sliding slot is recessed inwards with an opening at each end thereof; the portable power bank module is assembled to the sliding slot via the guiding mounting rod; one side of the card case module is provided with a connecting strap which is hollow inside and opens at both ends; the connecting strap is connected to the connector via a connecting shaft.

Preferably, the portable power bank module comprises a lower lid, a middle frame, an upper lid and a battery; the battery is locked in a case formed by the lower lid, the middle frame and the upper lid; a PCBA board electrically connected to the battery is positioned inside the case; the PCBA board is further provided with an input/output port; the PCBA board is mounted on the middle frame and the input/output port is exposed outside the case.

Preferably, the input/output port is a Type-C port.
Preferably, the connecting shaft is a metal round rod.
Preferably, the card case module is provided with slots on both sides for receiving cards.

This invention has the advantages of providing users with the convenience of card storage and serving as a contingency power supply for supplying power to electronic devices. It serves multiple functions and is convenient for actual use. It is easy to carry, helps to prevent loss of properties, and suitable for users' needs. The card case module and the portable power bank module can be dissembled and used separately.

DETAILED DESCRIPTION OF THE INVENTION

Figure 1:
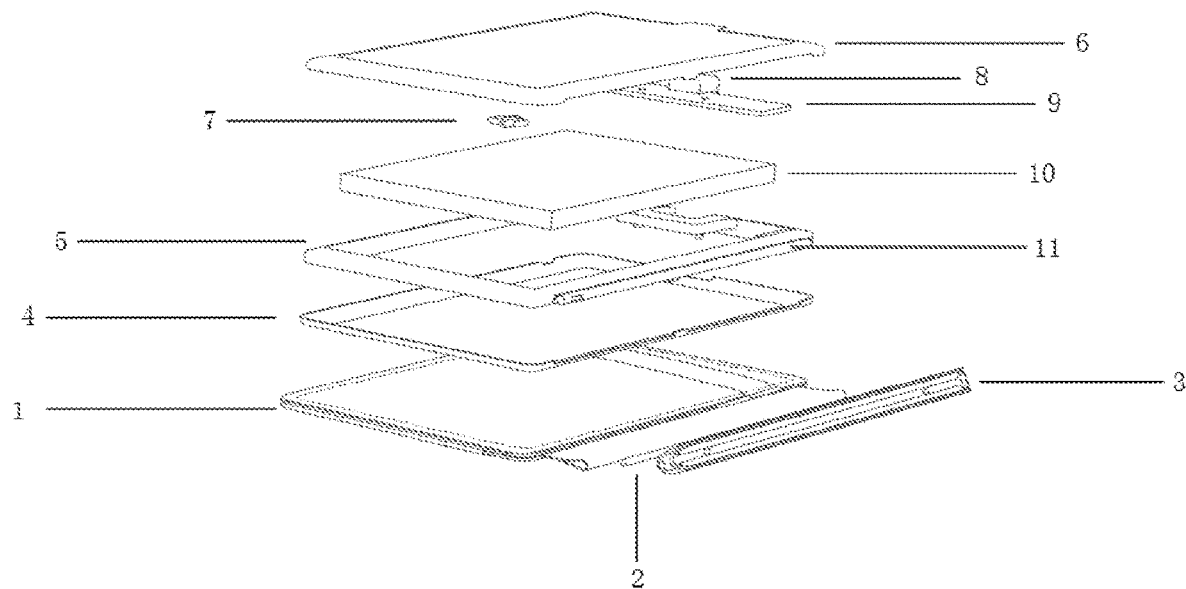
FIG. 1 is an exploded view of this invention.
Figure 2:
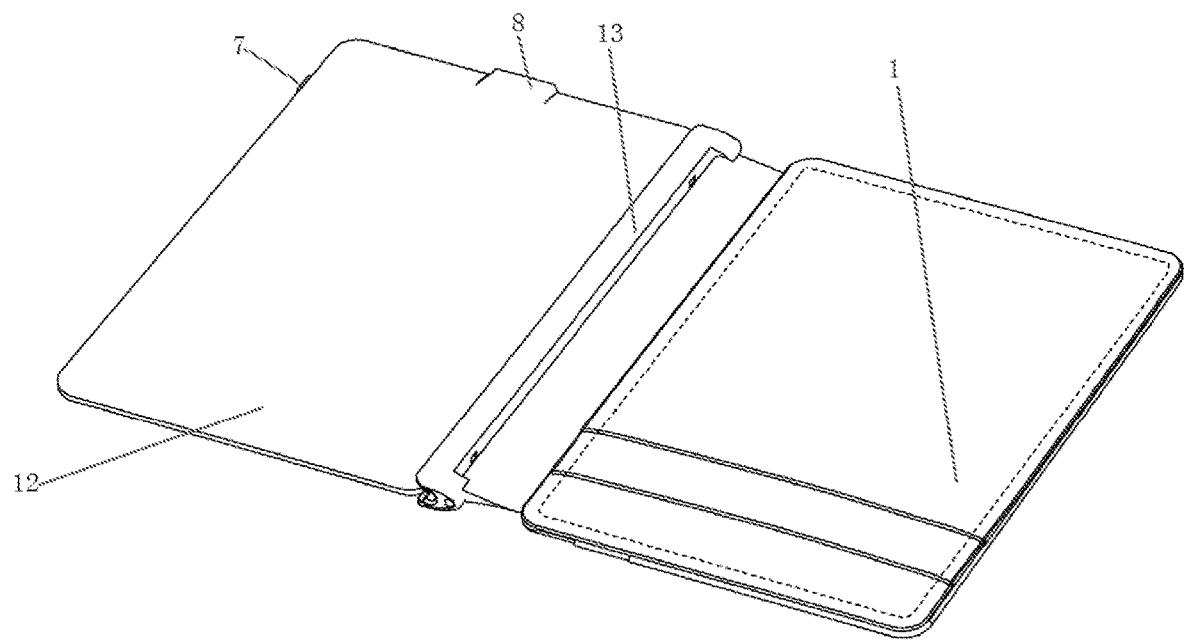
FIG. 2 is a schematic view of this invention.
In the figures, 1 denotes the card case module; 2 denotes the connecting shaft; 3 denotes the sliding slot; 4 denotes the lower lid; 5 denotes the middle frame; 6 denotes the upper lid; 7 denotes the switch; 8 denotes the input/output port; 9 denotes the PCBA board; 10 denotes the battery; 11 denotes the guiding mounting rod; 12 denotes the case; 13 denotes the connector.

To facilitate comprehension of this invention, this invention will be described in more detail with reference to the accompanying drawings. The drawings illustrate a preferred embodiment of this invention, but this invention may be embodied in many different forms and is not limited to the embodiment described herein. Rather, the embodiment is provided for a more thorough comprehension of the disclosure of this invention.

It should be noted that when a module is referred to as being "fixed" or "connected" to another module, it can be fixed or connected directly or indirectly via an intermediate module to the other module. In contrast, when a module is referred to as being "directly on" another module, there is no intermediate module. The terms "vertical", "horizontal", "left", "right" and the like as used herein are for illustrative purposes and are not meant to be the only embodiment. The terms "upper end", "lower end", "left side", "right side", "front end", "rear end" and the like as used herein represent the positional relationships with reference to the drawings.

All technical and scientific terms used herein have the same meaning as commonly understood by those skilled in the art. The terminology used herein is for describing the embodiment and is not intended to limit this invention. The term "and/or" used herein includes any and all combinations of one or more of the associated listed items.

This invention is described in further detail below with specific embodiments.

As illustrated in the drawings, a portable power bank with card storage function comprises a card case module 1 and a portable power bank module. The card case module 1 and the portable power bank module are slidably connected via a connector 13. A connecting strap which is hollow inside and opens at both ends is provided on one side of the card case module 1. The connecting strap is connected to the connector 13 via a connecting shaft 2. The connector 13 is provided with a sliding slot 3 which is recessed inwards with an opening at each end thereof. The portable power bank module is provided with a guiding mounting rod 11. The guiding mounting rod 11 is mounted in the sliding slot 3 of the connector 13. The sliding slot 3 has a smaller diameter at the openings at both ends. After the portable power bank module is assembled to the sliding slot 3 via the guiding mounting rod 11, the portable power bank is movable in the sliding slot 3 in a direction along the two openings of the sliding slot 3. The card case module 1 and the portable power bank module can be used separately. The portable power bank module comprises a lower lid 4, a middle frame 5, an upper lid 6 and a battery 10. The lower lid 4, the middle frame 5 and the upper lid 6 cooperate with each other to lock the battery 10 in a case 12 formed by the lower lid 4, the middle frame 5 and the upper lid 6. A PCBA board 9 is disposed in the case 12. The PCBA board 9 is electrically connected to the battery 10. The PCBA board 9 is further provided with an input/output port 8. The PCBA board 9 is mounted on the middle frame 5 and the input/output port 8 is exposed outside the case 12.

A switch 7 is electrically connected to the PCBA board 9 for controlling the PCBA board 9 to supply power to other electronic devices via the input/output port 8.

The input/output port 8 is a Type-C port. Both input and output of battery power in the portable power bank module are via the input/output port 8. In actual production, the input/output port 8 may also be other types of port.

The connecting shaft 2 is a metal round rod.

The card case module 1 is provided with slots on both sides for receiving cards.

This invention has the advantages of providing users with the convenience of card storage and serving as a contingency power supply for supplying power to electronic devices. It serves multiple functions and is convenient for actual use. It is easy to carry, helps to prevent loss of properties, and suitable for users' needs. The card case module 1 and the portable power bank module can be dissembled and used separately.

The foregoing is only used for describing this invention without limiting this invention. Those skilled in the art may implement modifications and changes not deviated from the spirit of this invention. All equivalent embodiments are within the scope of this invention. The scope of this invention is defined by the claims.

What is claimed is:

1. A portable power bank with card storage function, wherein the portable power bank comprises a portable power bank module and a card case module; the portable power bank module and the card case module are slidably connected via a connector; the portable power bank module is provided with a guiding mounting rod; the guiding mounting rod is mounted in a sliding slot of the connector; the sliding slot is recessed inwards with an opening at each end thereof; the portable power bank module is assembled to the sliding slot via the guiding mounting rod; one side of the card case module is provided with a connecting strap which is hollow inside and opens at both ends; the connecting strap is connected to the connector via a connecting shaft.

2. The portable power bank with card storage function as in claim 1, wherein the portable power bank module comprises a lower lid, a middle frame, an upper lid and a battery; the battery is locked in a case formed by the lower lid, the middle frame and the upper lid; a PCBA board electrically connected to the battery is positioned inside the case; the PCBA board is further provided with an input/output port; the PCBA board is mounted on the middle frame and the input/output port is exposed outside the case.

3. The portable power bank with card storage function as in claim 1, wherein the input/output port is a Type-C port.

4. The portable power bank with card storage function as in claim 1, wherein the connecting shaft is a metal round rod.

5. The portable power bank with card storage function as in claim 1, wherein the card case module is provided with slots on both sides for receiving cards.

* * * * *